(12) United States Patent
Kleimann et al.

(10) Patent No.: US 7,588,526 B2
(45) Date of Patent: Sep. 15, 2009

(54) LUBRICATING SYSTEM FOR A CENTRIFUGE DRIVE

(75) Inventors: Thomas Kleimann, Oelde (DE); Daniel Senger, Ennigerloh-Ostenfelde (DE); Thomas Kottenstedte, Oelde (DE)

(73) Assignee: Westfalia Separator AG, Oelde (DE)

( * ) Notice: Subject to any disclaimer, the term of this patent is extended or adjusted under 35 U.S.C. 154(b) by 235 days.

(21) Appl. No.: 11/833,327

(22) Filed: Aug. 3, 2007

(65) Prior Publication Data

US 2009/0111676 A1 Apr. 30, 2009

(51) Int. Cl.
*B04B 9/00* (2006.01)
(52) U.S. Cl. .................. 494/15; 494/83; 184/6.18
(58) Field of Classification Search .......... 494/15, 494/38, 41, 43, 67–73, 83–84; 184/6.18; 384/465, 472–474
See application file for complete search history.

(56) References Cited

U.S. PATENT DOCUMENTS

| | | | | |
|---|---|---|---|---|
| 1,461,031 | A * | 7/1923 | Feldmeier | 494/15 |
| 1,608,413 | A * | 11/1926 | Mortensen | 184/11.1 |
| 3,604,769 | A * | 9/1971 | Latham, Jr. | 384/476 |
| 4,556,331 | A | 12/1985 | Munde et al. | |
| 5,848,959 | A * | 12/1998 | Droste et al. | 494/15 |
| 6,117,063 | A * | 9/2000 | Szepessy et al. | 494/14 |
| 6,228,016 | B1 * | 5/2001 | Kristensen et al. | 494/14 |
| 6,267,204 | B1 * | 7/2001 | Kristensen et al. | 184/6.18 |
| 6,626,814 | B1 * | 9/2003 | Setterberg | 494/15 |
| 6,988,980 | B2 * | 1/2006 | Moss | 494/15 |
| 2009/0111676 | A1 * | 4/2009 | Kleimann et al. | 494/46 |

FOREIGN PATENT DOCUMENTS

| | | |
|---|---|---|
| DE | 621907 C | 11/1935 |
| DE | 625916 C | 2/1936 |
| DE | 3414774 A | 10/1984 |
| DE | 1943204 A | 7/2007 |
| EP | 54502 A1 * | 6/1982 |
| EP | 215585 A1 * | 3/1987 |

(Continued)

*Primary Examiner*—Charles E Cooley
(74) *Attorney, Agent, or Firm*—Gauthier & Connors LLP

(57) ABSTRACT

A centrifuge, in particular a separator, having a rotating, vertically oriented drive spindle, which is supported on a machine frame by a bearing device, which exhibits at least one step bearing or lower thrust bearing and preferably one upper collar bearing, which are arranged in a common frame and lubrication space, which in its lower region is fashioned as an oil pan, the step bearing being enclosed by a cup element having a cylindrical outer shell and one open axial end and one closed axial end, through which cup element the drive spindle passes in centric fashion, the drive spindle and the cup element being connected to each other so as to be rotationally fixed relative to each other, a fin, which rotates along with the drive spindle, serving to generate a flow of air. Here the at least one fin is arranged directly on the drive spindle or on an element rotating with the drive spindle inside the cup element below the step bearing, and the cup element is provided with one or a plurality of penetrations or holes, so that an underpressure or partial vacuum can be generated when the centrifuge is in operation, which underpressure draws the swirled-up oil mist of air and oil through the holes of the cup element into the cup element and from the top through the step bearing.

6 Claims, 3 Drawing Sheets

FOREIGN PATENT DOCUMENTS

| | | |
|---|---|---|
| EP | 0215585 A1 | 3/1987 |
| EP | 0756897 A1 | 2/1997 |
| WO | 89/10794 A | 11/1989 |
| WO | WO 9630694 A1 * | 10/1996 |
| WO | 00/53329 A1 * | 9/2000 |

* cited by examiner

PRIOR ART

LUBRICATING SYSTEM FOR A CENTRIFUGE DRIVE

PRIORITY INFORMATION

This application claims benefit of International Patent Application No. PCT/EP2006/050632, filed on Feb. 2, 2006 and claims priority to German Patent Application No. 20 2005 001 716.7, filed on Feb. 3, 2005 all of which are incorporated herein in their entirety.

BACKGROUND OF THE INVENTION

Field of the Invention

The invention relates to a centrifuge, in particular a separator, having a vertical axis of rotation, which is supported on a machine frame by a bearing device. The bearing device exhibits at least one step bearing or lower thrust bearing and preferably one upper collar bearing, which are arranged in a common frame and lubrication space.

Separators with vertical axes of rotation have been known per se for a long time, one such in a design having a centrifugal drum in which there is arranged a disc stack made up of a plurality of discs lying axially one upon another in the direction of the disc axis.

In the case of separators with vertical axes of rotation, product is generally admitted into the centrifugal drum along the machine axis via a feed tube and radial distribution channels downstream thereof, the product once in the centrifugal drum entering a disc assembly made up of conical (separatory) discs is generally arranged close together and spaced apart relative to one another. Heavy solids are generally deposited on the bottom of the separatory disc and migrate to the outer circumference of the disc stack, while in contrast the liquid runs inwardly.

Along with product feed into the drum from the top, it is also known to feed the product from below, for example through a hollow spindle, which most commonly also serves as a drive shaft for the drum. In this way the product is gently brought up to the operating speed of rotation by friction against the rotating drive spindle, which is advantageous in the processing of certain products.

In this design especially, but also with "top" feed of product into the drum, the supporting and lubrication of the drive spindle represents a special problem.

For example, it is known to use a bearing device exhibiting at least one step bearing or lower thrust bearing and one collar bearing to support the drive spindle. A known variant of this support is, a cup having a cylindrical outer shell as well as one open and one closed end is attached to the drive spindle so as to be rotationally fixed relative to the drive spindle, with the open end facing downward. The cup thus concentrically encloses the drive spindle and the lower step bearing of the drive spindle. The step bearing stands in the oil bath. The cup has its open lower end dipping into an oil bath (or oil sump). In this region it is provided, for example, with small notches. FIG. 3 depicts such a prior art reference.

In this construction, when the drive spindle turns, it carries the cup along. Because of the high rotational speed, the cup in the oil bath generates an oil mist with which the upper bearing of the drive spindle of the centrifugal drum is lubricated.

Further prior art documents are German Patent No. DE 625 916C, German Patent No. DE 621 907 C, German Patent No. DE 34 14 774 A, German Patent No. DE 19 43 204 A, European Patent No. EP 0 756 897 A1 and European Patent No. EP 0 215 585 A.

With reference to German Patent No. DE 621 907 there is disclosed a centrifuge having a drive spindle that is fashioned hollow and also serves for product feed. The centrifuge further exhibits a worm drive, which is spray-lubricated and impels oil, which runs on the drive spindle through a collar and through the single roller bearing of the drive spindle. Below the spindle bearing on the drive spindle there is arranged an annular space in which oil collects, a further collar of a labyrinth seal being arranged in the annular space. This further collar dips into oil that has run through the upper, first collar having a spindle penetration, then collects in the annular space, impelling oil, which is led through ducts back into an oil reservoir on the frame. In this way, in the manner of a labyrinth seal, oil running down the drive spindle is prevented from possibly reaching the region of the product feed, which is provided with a rotary penetration, and possibly contaminating the centrifuge feed. Despite this practice, the construction does not satisfy more stringent purity requirements, because it is always possible for oil to reach the region of the product feed.

German Patent No. DE 625 916 C discloses a seal on the drive spindle bearing with which, when processing a light liquid centrifuge feed, this centrifuge feed is supposed to be prevented from running through the collar bearing and into the drive region.

German Patent No. DE 34 14 774 A1 discloses that, in the case of an upper collar bearing of a vertically oriented drive spindle for a centrifuge, there is generated an air flow from below through the collar bearing, which entrains an oil mist with which the bearing is lubricated. An impeller above the collar bearing serves to generate the air flow.

According to German Patent No. DE 1 943 204 A, the region arranged between the collar bearing and the step bearing of a drive spindle is cooled by oil and air in order to prevent the product being processed from being overheated.

From European Patent No. EP 0 215 585 A1 it is known to arrange, below a step bearing of a drive spindle for a centrifuge, an oil sump into which a cup collar of a labyrinth seal dips, which impels droplets of oil out of the oil sump in order to lubricate the collar bearing and the step bearing.

European Patent No. EP 0 756 897 A1 discloses a design of the stated kind that uses a vane above a bearing guide ring to draw oil from below through a penetration in the bearing guide ring, so that there arises an oil mist that lubricates the collar bearing among other things. A part of the oil mist flows back through the rotor and the step bearing lying therebelow. The rotor is arranged above the bearing and outside or above the bearing guide ring.

SUMMARY OF THE INVENTION

Specifically in the case of product feed from below through the drive spindle, it is desirable to hold the oil level of the oil bath below the step bearing, since in this way simple sealing becomes possible. A highly serviceable supporting and lubrication of the step bearing are supposed to be achieved nevertheless. At the same time, the spindle end is supposed to be free for other functions such as for example product feeding.

It is the goal of the invention to create such a centrifuge having lubrication of the step bearing that is improved relative to the prior art.

According to this invention, the step bearing or lower thrust bearing is enclosed by a cup element having a cylindrical outer shell and one open axial end and one closed axial end, cup the drive spindle passes in centric fashion, the drive spindle and the cup element being connected to one another so as to be rotationally fixed relative to each other. The at least one fin is further arranged directly on the drive spindle or on an element rotating along with the drive spindle inside the cup element below the step bearing, and the cup element is provided with one or a plurality of penetrations or holes in such fashion that, when the centrifuge is in operation, an underpressure or partial vacuum can be generated, which draws the swirled-up oil mist of air and oil from above through the holes in the cup element into the cup element and from the top downwardly through the step bearing. In this way this bearing is lubricated in simple and extremely reliable fashion with an oriented flow of oil mist, without its having to be arranged in the oil bath itself.

Because the step bearing and the collar bearing are arranged in a common frame and lubrication space, which is fashioned in its lower region as an oil pan, the underpressure drawing the oil through the step bearing, the step bearing can advantageously be arranged above the oil level.

The fins are preferably arranged about the drive spindle inside the cup element in an annular space below the step bearing.

Particularly advantageous developments can be inferred from the remaining dependent Claims.

BRIEF DESCRIPTION OF THE DRAWINGS

In what follows, the invention is described in greater detail, further advantages of the invention also becoming clear, on the basis of exemplary embodiments with reference to the drawings, in which.

DETAILED DESCRIPTION OF THE INVENTION

Figure 1:
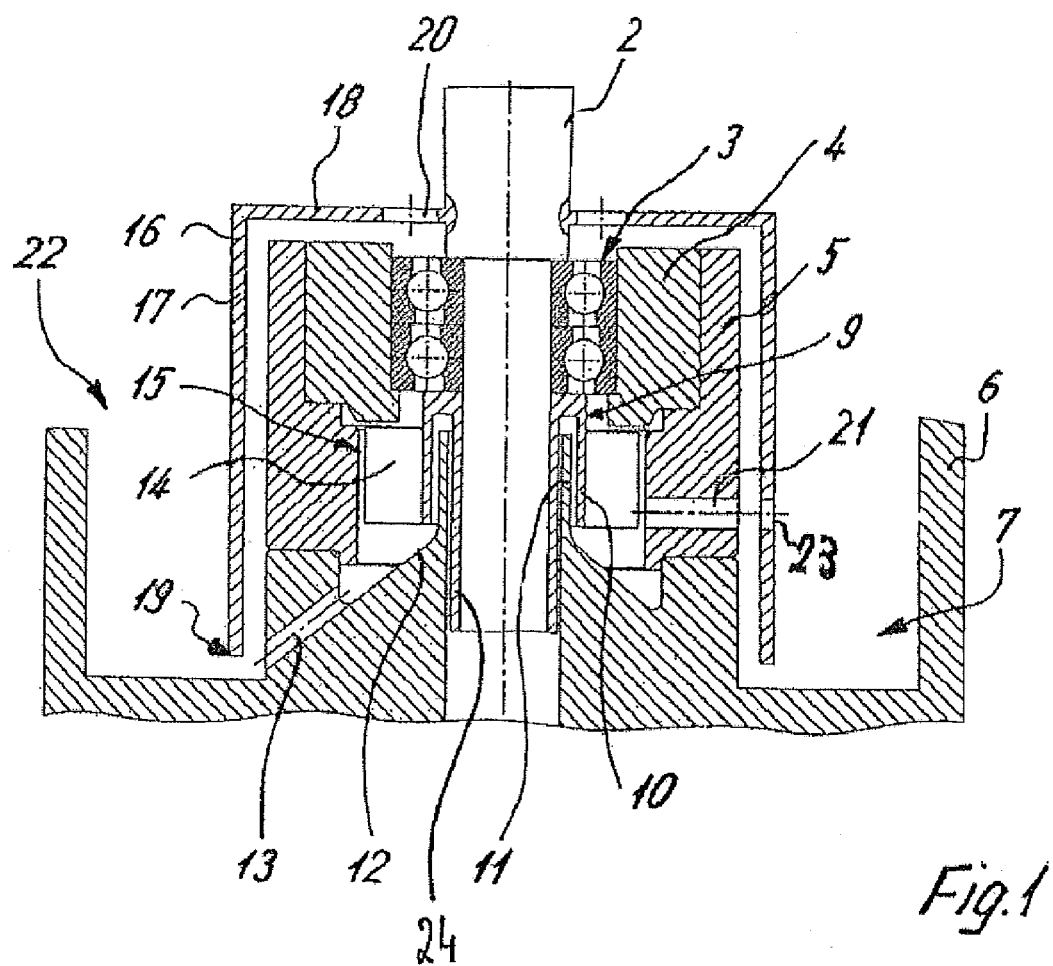
FIG. 1 is a view of a step bearing on a separator spindle having a bearing device according to the invention.

FIG. 1 depicts a vertically oriented drive spindle 2, which can optionally exhibit a centric hole 1 (see FIG. 2) in the manner of a hollow shaft, on whose upper end, for example conical, not illustrated here, there is set a centrifugal drum. Drive spindle 2 is supported by an upper collar bearing (which cannot be seen here) and a lower step bearing 3—which here, by way of example, comprises two angular ball bearings—via a bearing guide ring 4 (or external bearing ring) enclosing the bearings and a preferably cylindrical bearing housing 5, in or on a machine frame 6. Fashioned or arranged on the machine frame in its lower region is an oil pan 7, which encloses both the step bearing and also the collar bearing as a frame and lubrication space 22 (see FIG. 3). Items 4 and 5 might also be fashioned in one piece.

Oil level 8 in the oil sump (see FIG. 2) in oil pan 7 lies below step bearing 3 when the spindle is at rest and not rotating.

Figure 2:
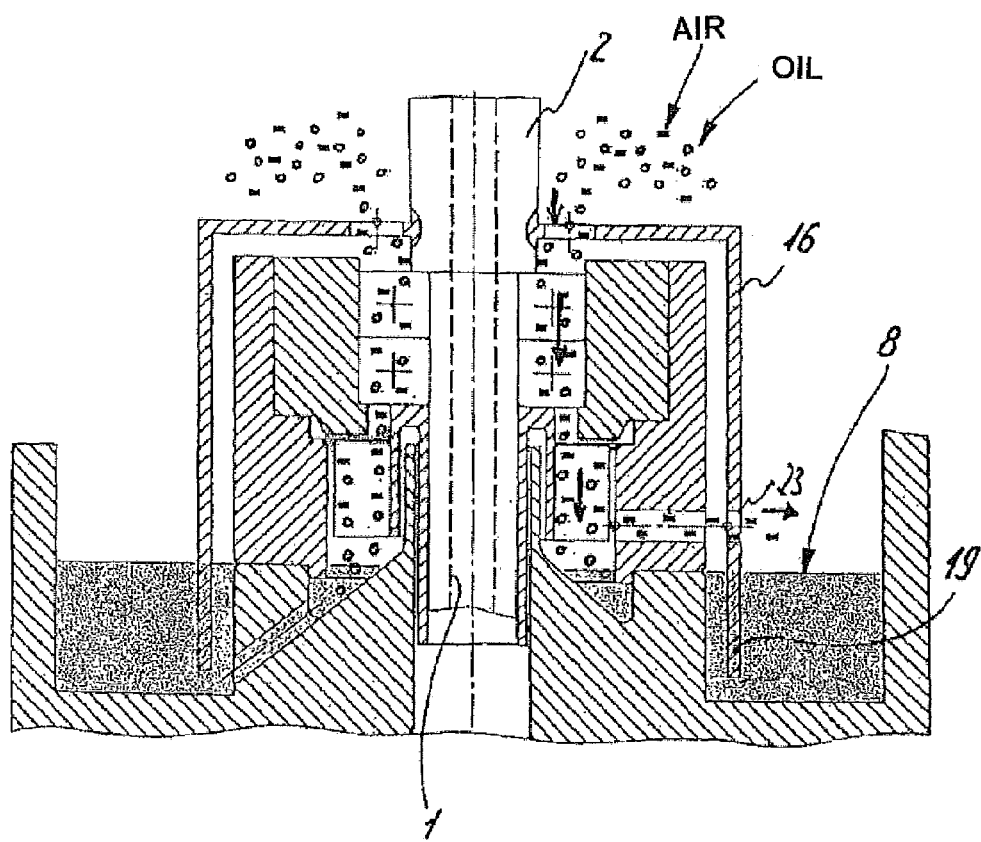
FIG. 2 is a view of the arrangement of FIG. 1 in operation, in simplified representation.
Figure 3:
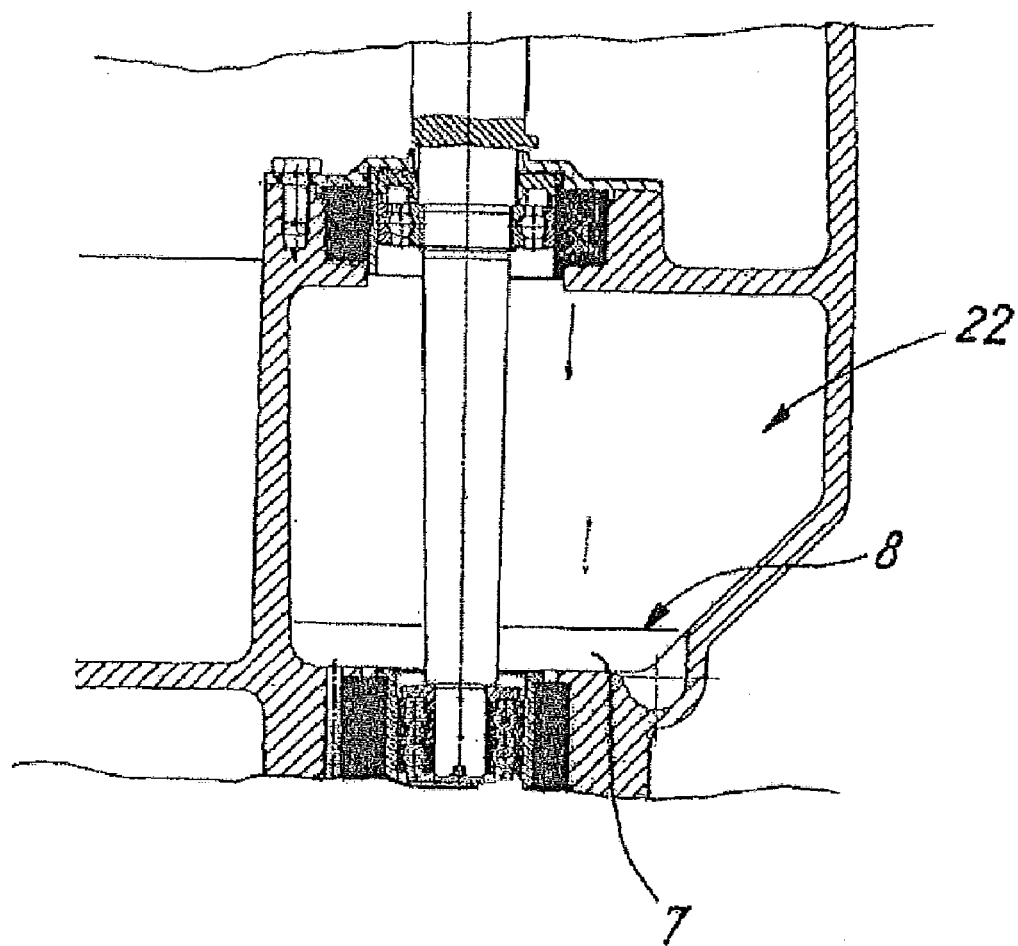
FIG. 3 is a detail, illustrated in schematized form, arrangement according to the prior art.

Below step bearing 3, drive spindle 2 is enclosed by a labyrinth seal 9, which prevents oil from getting up to the lower axial end of drive spindle 2, which is advantageous particularly when, for example, drive spindle 2—as here—is internally hollow and serves to deliver the centrifuge feed into the centrifugal drum (see hole in FIG. 2). In this case, or as a rule, drive spindle 2 also protrudes through the machine frame (hole 1) and the product is transferred through a rotary penetration, which cannot be seen here.

Labyrinth seal 9 comprises an upper seal sleeve 10 rotating along with drive spindle 2 and a lower nonrotating seal sleeve 11, which engages in upper seal sleeve 10 and is arranged on machine frame 6. Seal sleeve 10 here has an inner sleeve section 24 protruding into seal sleeve 11. Between inner sleeve section 24 and lower seal sleeve 11 there is a narrow clearance, which forms the separation between rotating and stationary parts of the labyrinth system. Sleeve section 24 can be omitted as appropriate, a gap then being fashioned directly between spindle and lower seal sleeve 11.

Lower seal sleeve 11 makes a transition downwardly into a conically expanding part 12 of machine frame 6, in which connecting passages 13 to oil pan 7 are fashioned, so that oil or oil mist can flow or be conveyed through connecting passages 13, which here are oriented obliquely downwardly as well as outwardly, into oil pan 7 or the oil sump.

Upper seal sleeve 10 is provided on its outside with radially outwardly oriented fins 14, which rotate along with the upper seal sleeve and drive spindle 2 when in operation.

Radially outside fins 14 in annular space 15, bearing housing 5 is provided with passages 21, which here pass through bearing housing 5 radially outwardly from the inside.

Set on vertically oriented drive spindle 2 is a cup element 16 corotating therewith, having a cylindrical outer shell 17 and one open and one closed axial end 18 (base), through which cup element drive spindle 2 passes in centric fashion.

Here base 18 is arranged above step bearing 3 and attached to drive spindle 2. Outer shell 17 encloses step bearing 3 and its bearing housing 5 in concentric fashion. Lower rim 19 of cup element 16 dips in oil pan 7 down to below oil level 8 (in the at-rest condition).

In upper base 18, cup element 16 is provided with one or a plurality of penetrations or holes 20 about drive spindle 2.

This arrangement functions in the following way.

When drive spindle 2 turns, it carries cup element 16 along. The latter sets the oil in rotation and simultaneously swirls up oil droplets (illustrated as circles in FIG. 2) with its lower rim 19, which oil droplets distribute themselves in frame space 22 so that an oil mist forms, the collar bearing above step bearing 3 is lubricated. The free surface of the oil subsides in the region of the cup element and rises in the outward direction.

Because fins 14 are arranged on upper seal sleeve 10 of labyrinth seal 9 and fins 14 rotate along with drive spindle 2, a underpressure is generated in the interior of cup element 16 in annular space 15, in which fins 14 are rotating with drive spindle 2.

This underpressure draws (see FIG. 2) the swirled-up oil mist of air (rectangles) and oil (circles) from the top through holes 20 in cup element 16 into cup element 16 and from the top downwardly through step bearing 3, because fins 14 are located below step bearing 3.

The indrawn air (rectangles) along with part of the oil is substantially led via radially oriented passages 21 back into frame space 22 above oil pan 7.

To this end, cup element 16 likewise exhibits holes 23 in radial prolongation of holes 21, so that the air—possibly still enriched with some few oil droplets—can here flow from the inside outwardly through cup element 16.

A further part of the oil mist (oil droplets as circles), in contrast, flows substantially through further connecting passages 13, arranged lower down, from annular space 15 below step bearing 3 back into oil pan 7.

In this way, improved lubrication of step bearing 3 is achieved in a fashion simple as to design and reliable, without step bearing 3 per se being located in the oil sump.

We claim:

1. A centrifuge, in particular, a separator, having
   a. a rotating, vertically oriented drive spindle, which is supported on a machine frame by a bearing device, which exhibits at least one step bearing or lower thrust bearing and preferably one upper collar bearing, which are arranged in a common frame and lubrication space, which in its lower region is fashioned as an oil pan, the step bearing being supported in a machine frame along with an external bearing ring or bearing guide ring and/or a bearing housing enclosing the step bearing, the oil level in the oil pan lying below the step bearing when the drive spindle is not rotating, b. a fin, which rotates along with the drive spindle (2) and serves to generate a flow of air, wherein c. the step bearing is enclosed by a cup element having a cylindrical outer shell and one open axial end and one closed axial end, through which cup element the drive spindle passes in centric fashion, and the drive spindle and the cup element being connected to each other so as to be rotationally fixed relative to each other, d. the at least one fin is arranged directly on the drive spindle or on an element rotating with the drive spindle inside the cup element below the step bearing, and e. the cup element is provided with one or a plurality of penetrations or holes, so that an underpressure or partial vacuum can be generated when the centrifuge is in operation, which underpressure draws the swirled-up oil mist of air and oil through the holes of the cup element into the cup element and from the top through the step bearing.

2. The centrifuge according to claim 1, wherein the fins are distributed about the drive spindle in an annular space below the step bearing.

3. The centrifuge according to claim 1, wherein the drive spindle is enclosed by a labyrinth seal below the step bearing inside the cup element, which labyrinth seal exhibits an upper seal sleeve rotating along with the drive spindle and a lower, nonrotating seal sleeve, the fins being distributed at the outer circumference of the upper, rotating seal sleeve.

4. The centrifuge according to claim 1, wherein the annular space accommodating the fins is connected to the oil pan via connecting passages.

5. The centrifuge according to claim 1, wherein the bearing housing is provided with passages that pass through the bearing housing from the annular space into the frame space.

6. The centrifuge according to claim 1, wherein the cup element exhibits further corresponding holes preferably in radial prolongation of the holes.

* * * * *

UNITED STATES PATENT AND TRADEMARK OFFICE
CERTIFICATE OF CORRECTION

PATENT NO. : 7,588,526 B2  
APPLICATION NO. : 11/833327  
DATED : September 15, 2009  
INVENTOR(S) : Kleimann et al.

Page 1 of 1

It is certified that error appears in the above-identified patent and that said Letters Patent is hereby corrected as shown below:

Title Page, Item (63) inserted after (22)

--Related U.S. Application Data

(63) Continuation of application No. PCT/EP2006/050632, filed on February 2, 2006.--

Signed and Sealed this

Tenth Day of November, 2009

David J. Kappos  
*Director of the United States Patent and Trademark Office*